United States Patent [19]
Unkauf et al.
[11] 3,899,740
[45] Aug. 12, 1975

[54] FM SIDETONE PHASE COMPARISON SYSTEM

[75] Inventors: Manfred G. Unkauf, Franklin; Derek V. Harris, Acton; Sven G. Gustafsson, Framingham, all of Mass.

[73] Assignee: Raytheon Company, Lexington, Mass.

[22] Filed: Nov. 21, 1973

[21] Appl. No.: 417,986

Related U.S. Application Data

[63] Continuation of Ser. No. 297,144, Oct. 12, 1972, abandoned, which is a continuation of Ser. No. 85,615, Oct. 30, 1970, abandoned.

[52] U.S. Cl. .......... 325/349; 325/7; 325/65; 325/476; 328/165; 328/134; 329/135

[51] Int. Cl.$^{2}$ .......... H04B 1/16

[58] Field of Search .......... 325/42, 65, 322–325, 325/344, 346, 349, 351, 472, 473, 474, 476, 478, 313, 7; 328/152, 162, 164, 165, 133, 134; 331/23; 329/122, 135

[56] References Cited

UNITED STATES PATENTS

| | | | |
|---|---|---|---|
| 2,929,057 | 3/1960 | Green | 343/14 |
| 3,105,967 | 10/1963 | Cook et al. | 343/17.2 |
| 3,176,231 | 3/1965 | Vallese et al. | 329/132 X |
| 3,496,536 | 2/1970 | Wheeler et al. | 325/67 |
| 3,588,705 | 6/1971 | Loch | 325/478 |
| 3,603,890 | 9/1971 | Camenzind | 329/122 X |
| 3,742,361 | 6/1973 | Wason | 325/473 X |
| 3,769,602 | 10/1973 | Griswold | 325/346 X |
| 3,810,018 | 5/1974 | Stover | 325/346 X |

*Primary Examiner*—Albert J. Mayer
*Attorney, Agent, or Firm*—John R. Inge; Joseph D. Pannone; Milton D. Bartlett

[57] ABSTRACT

A phase determining system particularly suitable for accurate phase determination in a multipath signal environment such as a city wherein gross frequency disturbances are present during deep multipath fades. In a first embodiment, a received signal containing phase ranging information is inputted both to a gross frequency disturbance detection circuit and to a delayed demodulator circuit such that gross frequency disturbances are predetected and removed from the phase determinations made over several cycles thereby improving the accuracy of the phase determination. In an alternative embodiment, an iterative type system determines the phase of an incoming FM ranging signal and inputs that determination to another phase determining circuit simultaneous with the delayed signal with its associated phase errors. The second phase determining circuit contains an error gate which will discard the determination when the signal error lies outside the error gate and will substitute an average signal in its place; however, if the delayed signal is within the error gate, the signal will be averaged along with the phase determined signal from the first phase meter. Additional stages of iteration may be provided for increased accuracy.

12 Claims, 4 Drawing Figures

PATENTED AUG 12 1975 3,899,740

SHEET 3

FM SIDETONE PHASE COMPARISON SYSTEM

This is a continuation of application Ser. No. 297,144 filed Oct. 12, 1972, now abandoned, which is a continuation of application Ser. No. 85,615 filed Oct. 30, 1970, now abandoned.

REFERENCE TO RELATED CASE

Application Ser. No. 59,504 filed July 30, 1970 of Roger L. Fuller, Sven G. Gustafsson, Derek V. Harris, Robert K. Kay, and Joseph J. Oliver titled "Vehicle Command and Control System" and assigned to the same assignee as the present application is hereby incorporated herein by reference.

BACKGROUND AND SUMMARY OF THE INVENTION

This invention relates to a means for obtaining highly accurate phase determinations in environments such as urban areas containing high clutter and multipath effects which are generally unsuitable for accurate phase determinations. This invention is particularly suitably employed in phase ranging systems for a large number of mobile vehicles, for example service vehicles, such as police and emergency units and rapid transit buses and more particularly, with respect to the location of such vehicles in high clutter signal environments which are characteristic of urban centers having tall buildings.

In the contemporary art phase ranging of a vehicle in space has taken the form of high frequency highly directed antennas and propagation patterns. Additionally, the problems of multipath are in part avoided by using directive antennas and by pointing them skyward. Gross frequency disturbances have been determined in prior art and then averaged into phase determinations cyclically and an average reading taken including this error.

FM side tone ranging techniques are employed in multitransmitter systems to determine the range of a vehicle. This technique consists of frequency modulating an RF carrier with a sinusoidal tone which is transmitted to a vehicle. The vehicle in turn transponds the received FM signal containing the ranging tone modulated thereon to one or more receiving stations at either the same or at a different frequency. The receiving stations, which are synchronized, compare the phase of the received frequency demodulated tone with a reference tone locally generated to determine the phase shift propagation delay or range of the vehicle. In many applications it is necessary to time share the side tone ranging terminals with many vehicles, that is, to allocate a specific time interval for each vehicle during which that vehicle's transmitted signal will be received, hence each vehicle, upon individual command, periodically transponds the FM signal. Thus, the received signal upon which the modulation phase determination must be made has a relatively short duration and may consist of a fixed number of cycles of the modulating tone. Any erroneous received signals with gross frequency effects could not be removed by phase determining techniques of the prior art since limiting techniques would encompass too much of the interval present during which determinations could be made, hence elimination of these errors would also eliminate the true phase indication to be determined. The present predetection phase determination technique eliminates these gross frequency disturbances during a very short time constant with respect to the cycle to be determined.

In many applications the signal-to-noise ratio of the received FM signal is low due to multipath signal corruption, for example, UHF transmission in the urban environment results in severe signal fading due to multipath. During deep fade FM carrier-to-noise ratios in the IF bandwidth of less than 12 decibels are frequently encountered. As a result, an impulsive FM noise called click appears in the demodulated tone which produces a nonzero error in the resultant phase determination which is very substantial.

These gross frequency disturbances, or clicks produce false indications of zero phase especially in a fading channel in which there will be periods of very high signal-to-noise ratio and no gross frequency disturbances and also periods of deep fade during which a click will occur for almost every cycle of the modulation..

The present invention utilizes the correlation existing between the envelope of the received range tone modulated FM signal at the output of the usual intermediate frequency filter and the occurrence of gross frequency disturbances to recognize the occurrence of the clicks. This information is utilized in turn to gate out any contribution to the phase determining device for the expected duration of the gross frequency disturbance thus, the phase determination can be performed on a sample of the incoming signal free of those frequency disturbances.

In an alternative embodiment, the received FM side tone modulation signal is operated upon to obtain a rough phase determination and simultaneously delayed for the duration of the message length. If the phase determination is outside a window or fixed error range about the average expected value, or the value of the previous phase determination, it is discarded and the average mean value is substituted therefor while if the determined phase value is inside the window, that number is used unaltered.

Any desired number of iterations may be used depending only upon the accuracy desired.

It is therefore an object of this invention to provide an improved phase determining system.

It is an additional object of this invention to provide a phase determining system particularly suitable for use with a vehicle location system.

It is yet another object of this invention to provide an iterative phase determining system in which erroneous phase determinations lying outside a predetermined range are eliminated before averaging into the final phase determination thereby resulting in a phase determining system of improved accuracy.

It is yet an additional object of this invention to provide a gross frequency disturbance predetection circuit in a phase determining system for improving the accuracy of the system.

BRIEF DESCRIPTION OF THE DRAWINGS

Further objects and advantages of the invention will become apparent from the following specification taken in connection with the accompanying drawings wherein like reference characters identify parts of like function throughout the different views thereof.

DESCRIPTION OF THE PREFERRED EMBODIMENTS

Figure 1:
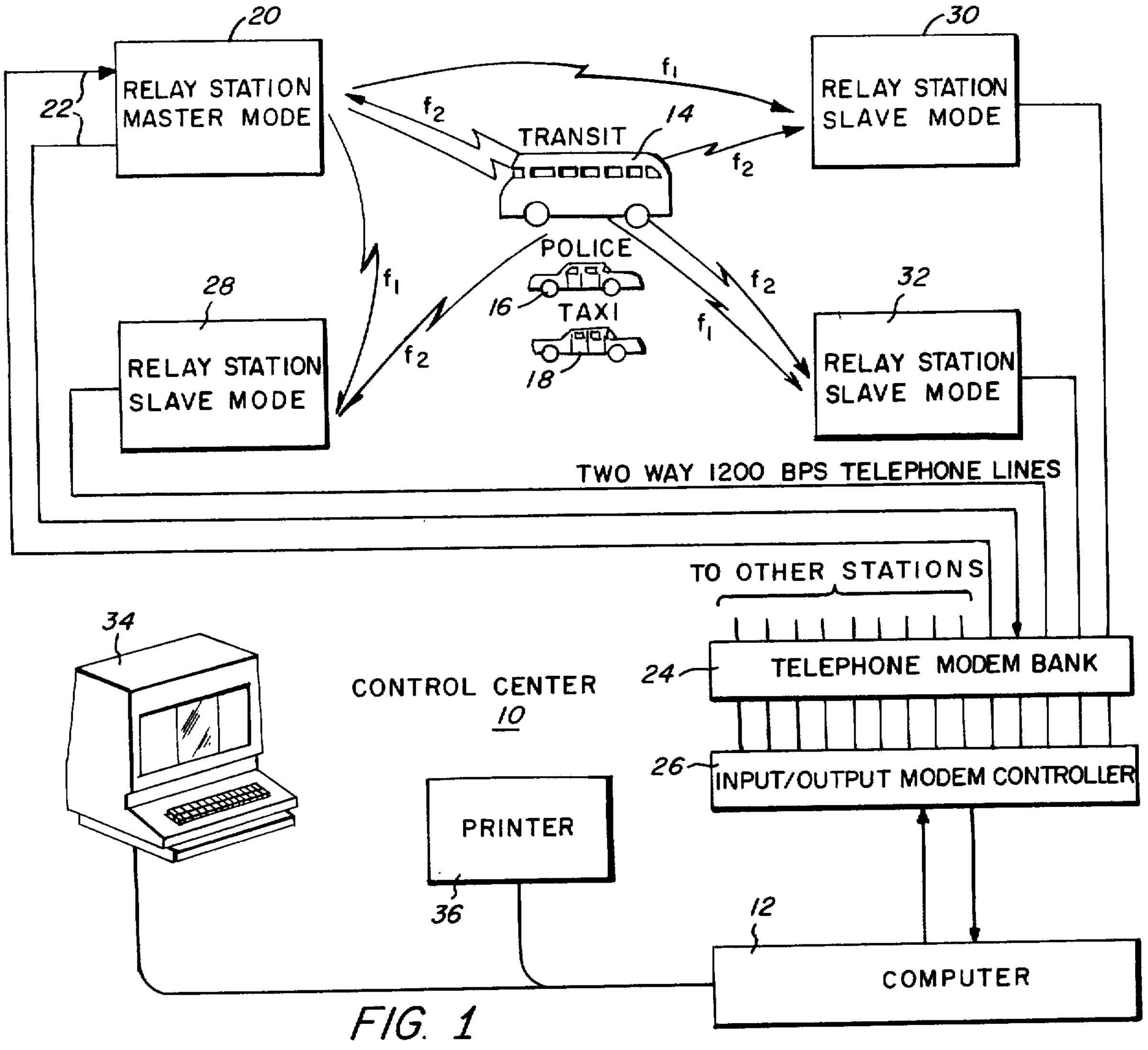
FIG. 1 is a block diagram of a communication and location system in which the phase determining system of the present invention may effectively be utilized.

Referring now to FIG. 1 there is shown a vehicle control ranging and communication system with which the present phase determining system may be utilized. A control center shown generally at 10 comprising a central computer 12 transmits a message containing the identity code of the particular vehicle with which communication is desired. Each vehicle in a fleet of vehicles such as transit buses, police cars, or taxis shown as 14, 16 and 18 respectively has a particular identity code comprised of digits to which a transponder in that particular vehicle and only the transponder in that particular vehicle responds. The transponder, not shown, is activated sequentially along with other transponders and other vehicles in their respective fleets of vehicles which may be present in the system. Thus, a sequential transmission and reception system is provided.

The control center 10 transmits a digitally coded message to a master relay station 20 via telephone land lines 22 over which data may be exchanged between the computer and the master relay station through a standard telephone modem bank 24 which is controlled by an input-output modem controller 26 for buffering data into and out of computer 12. The telephone modem bank and modem controller are of well known and conventional design.

Once this message is received via line 22 at the master relay station 20, it is transmitted with a ranging tone modulated thereon at a frequency f1, which may be, for example, 2700 hertz as frequency modulation on an RF carrier in the UHF region of, for example 460 megahertz.

This transmitted signal is received by all relay stations and vehicles within range of the master station. In the embodiment shown, these are relay stations 28, 30 and 32 and vehicles 14, 16 and 18; however, only the vehicle whose identity code is transmitted will retransmit and this retransmitted signal from the vehicle is received at the master relay station and at all other relay stations in the area.

A phase determination is made at the master relay station 20 and at each of the relay stations operating in the slave mode, within range, with the vehicle range determined by the phase difference between the ranging tone received from the master station and that received from the vehicle, which is preferably at a different frequency. These phase differences are proportional to the difference in path length traveled by the two transmissions. Since the relay stations locations are known to the computer the position of the vehicle can be determined in accordance with trilateration algorithm of the type described in the beforementioned copending application of Roger L. Fuller, et al.

The vehicle reply signal at frequency f2 includes a ranging tone modulated on f2. The original transmission from the master station at frequency f1 also incudes the ranging tone modulated thereon and when the reply signal at frequency f2 from the vehicle is received at the various stations the relative phase is determined with the signal representing the phase determination being transmitted back to the computer 12. This relative phase determination is perturbed by a number of phenomenon, the major one being that of multiple signal reflections from buildings and other objects in a major city.

In the representative system shown by FIG. 1, final range data and other data may be displayed on a visual display shown generally at 34 and printed on a printer 36 of standard and conventional design.

Figure 2:
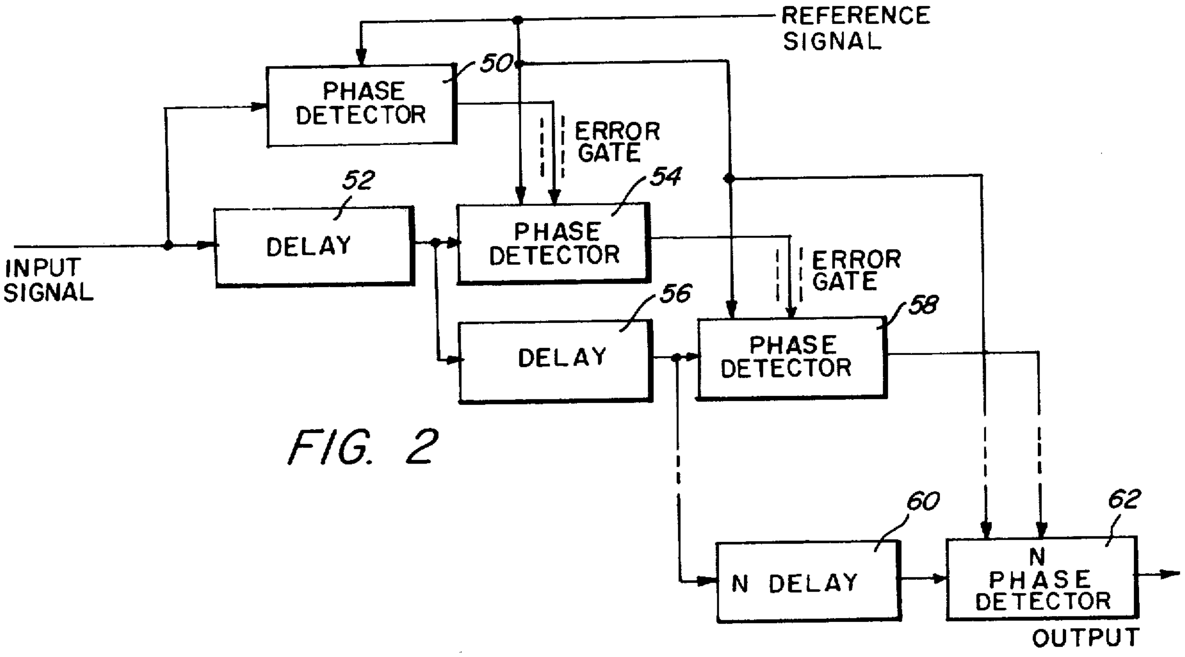
FIG. 2 is a block diagram of a specific embodiment of the phase determining system of the present invention.

Referring now to FIG. 2 a block diagram of the iteration technique employed in an embodiment of the present phase determining system is illustrated. Incoming signals upon which phase determinations must be made, particularly in FM side tone ranging systems, contain gross frequency disturbances or periods of very high noise with resultant false zero crossing indications or indications of zero phase. For example, with a side tone frequency of 2.7 kilohertz the intermediate frequency bandwidth is approximately 15 kilohertz or greater and the peak deviation is 5 kilohertz or less with an effective modulation index of approximately between 2 and 3. The probability of obtaining two or more gross frequency disturbances, or clicks, in a single half-cycle of a carrier is negligible compared with that of obtaining one gross frequency disturbance which has a zero crossing duration in the order of approximately 10 microseconds and spread out over a full cycle of the side tone causing a previously uncorrectable phase error.

In the context of the vehicle ranging system described with reference to FIG. 1, in which the actual distance ranging link is composed of a base station transmission to a vehicle which effectively relays the transmission back to a network of relay stations, the link from the master station to the vehicle has no protection from gross frequency disturbances. This is because the vehicle demodulates the received signal to baseband and then remodulates it for transmission. In order to comply with standard FCC requirements, at present it is necessary to band limit the base band of the transmitter to approximately 3 kilohertz, hence, the resultant spreading of the gross frequency disturbance over the full cycle of the side tone. This problem has been solved by actually transponding the vehicle received signal without demodulating it. However, the solution presents the problem of translating the received signal down to intermediate frequency for noise band limiting and the resultant frequency deviation is incorrect for the frequency multiplier type of transmitter, hence an additional two stages of mixing would be needed.

Techniques to cancel FM noise impulses cannot be employed because any practical technique will seriously distort the original side tone. Even if this distortion does not occur near the signal zero-phase crossings, the distortion is spread out by the transmitters input filters.

Assuming that the power radiated by the master relay station is the same as that radiated by a vehicle and that the antenna means are similar, then the link from the master relay station to the vehicle will generally be weaker than the return link where diversity reception is employed at the master relay station. Any gross frequency disturbance reduction device at the master station will reduce the overall range error due to FM noise by a factor which is significant since the base station actually represents cost wise only a small part of the overall system cost of a complex vehicle location system, hence it is desirable to employ sophisticated signal processing at the base station to gain even marginal improvements in performance.

A locally generated reference signal and an input signal, the phase of which is to be determined, are simultaneously applied to a phase detector 50 and to a delay network 52. Considering the number of cycles of a sinusoidal signal to be determined as a message length, the delay 52 delays the input signal one message length and the phase determination derived from phase detector 50 is applied to phase meter 54 along with the delayed input signal from the delay 52. The output of phase detector 50 represents the "answer"for a first phase determination taken of the input signal. If the phase determination, or answer, is within a predetermined range it is inputted to phase detector 54 along with the output of delay 52, however, if the output of phase detector 50 lies outside this error range, or window, it is discarded and an average value is substituted therefor.

The error gate is determined by a previous signal which was derived from phase detector 50 and an additional phase determination is now made at phase detector 54 between the output of phase detector 50 and the input signal thereby deriving an iterative and more accurate phase indication. This process may be repeated as many times as desired and with as narrow a window as desired. Thus, the output signal from delay 52 may again be delayed a message length by delay 56 and supplied along with the output of phase detector 54 to another phase detector 58 for a further phase determination, and again the output of phase detector 54 will be discarded if it lies outside the range established by another error gate between phase detectors 54 and 58 while any signal that lies within this window will again be operated upon. This iteration technique may be implemented as repetitively as desired for whatever accuracy is required to the Nth delay 60 and the Nth phase detector 62.

Figure 3:
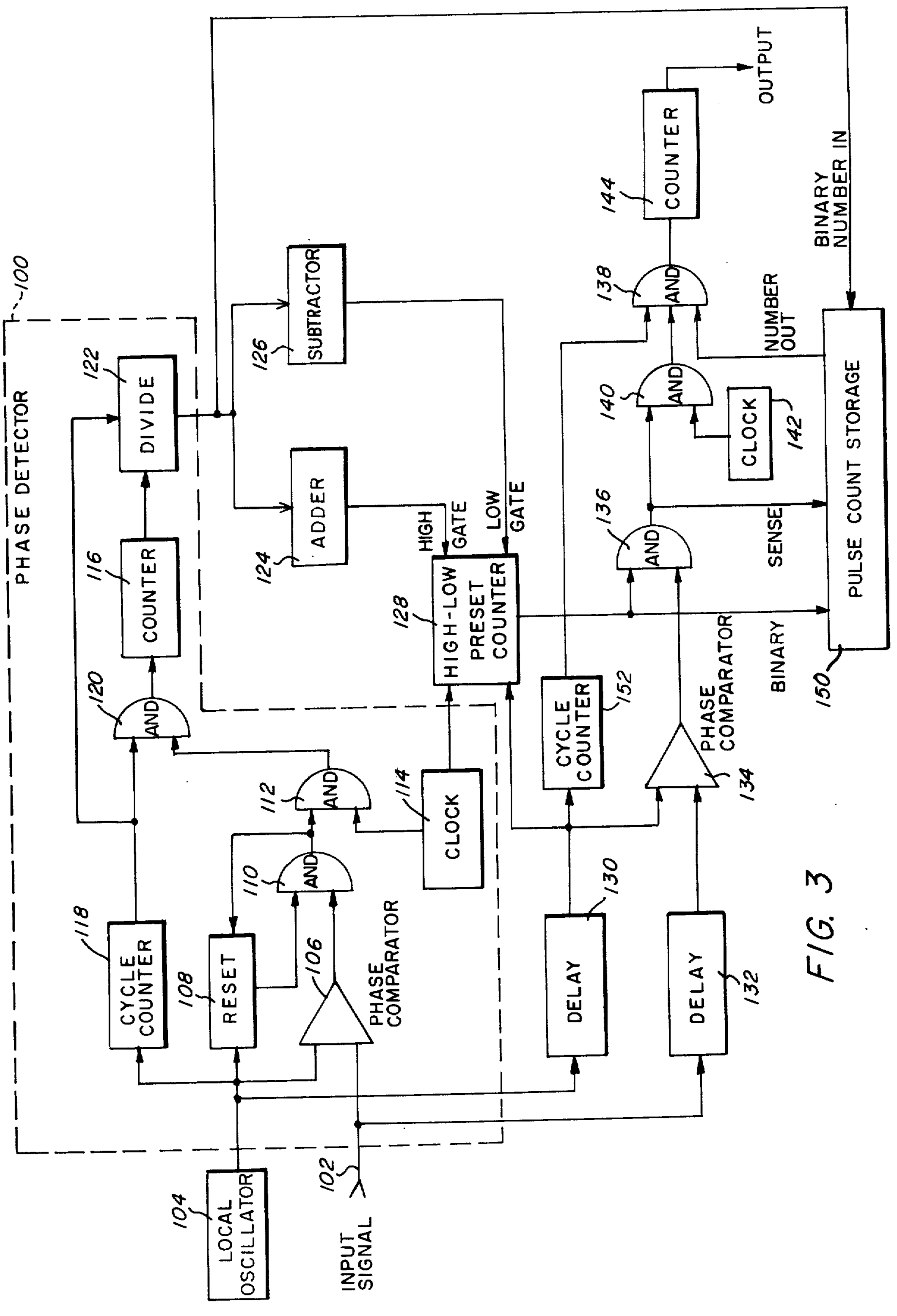
FIG. 3 is a more detailed block diagram of the phase determining system of FIG. 2.

Referring now to FIG. 3, there is disclosed a more detailed block diagram of the iterative phase determining technique described with respect fo FIG. 2. A phase detector 100, to be described, determines the phase of an input signal coupled to the phase detector via line 102 to make a first phase determination. When, for example, the input signal to be determined is an FM side tone sinusoidally modulated on a carrier as in a vehicle location system, the sequence of side tone cycles with a predetermined number of zero phase crossings both up and down occurs. Considering for example a sequence of 64 side tone cycles with 128 zero crossings, a zero crossing detector which accepts only the first zero crossing will have the following worst case phase error when determining a true 150° phase difference:

| No. of Gross Frequency Disturbances in 64 Cycles | Worst Case Phase |
|---|---|
| 0 | 150° |
| 1 | 148.8 |
| 2 | 147.6 |
| 3 | 146 |
| 4 | 145 |
| 5 | 144 |
| 6 | 143 |
| 7 | 141.7 |
| 8 | 140 |

The largest number of gross frequency disturbances shown, eight in 64 cycles, corresponds to an average signal-to-noise ratio of about 3 decibels. It can be seen that as the number of gross frequency disturbances increases, the phase determining accuracy is derogated.

The method employed by the embodiment illustrated in FIG. 3 to reduce gross frequency disturbance is to examine only a small time gate or window during which a zero crossing is expected. This is accomplished by first computing the average zero crossing without gross frequency disturbance correction, then using this expected phase for positioning a time gate for subsequent processing; hence an iterative approach is employed to reduce the phase error. This principal is also applicable in a phase detector employing the exclusive OR principal rather than zero crossing techniques.

A reference signal provided by local oscillator 104 is coupled to a phase comparator 106 of standard and conventional design along with the input signal on line 102. The output of phase comparator 106 is turned on by the zero crossing of the reference signal from local oscillator 104 and turned off by the input signal on line 102. Hence, the reference signal is also fed to a reset circuit 108 which forms an input to AND gate 110 along with the output of phase comparator 106, the output of which AND gate serves as one input to AND gate 112 and which also drives the reset gate 108. The other input to AND gate 112 is a high speed clock which is gated on by the interval between the zero crossing of the reference signal and the input signal. This gated clock output is then counted for a preset number of side tone cycles by counter 116 which is gated on by the simultaneous application of a previously stored phase determination in cycle counter 118 and the output of AND gate 112 into AND gate 120. The previous phase determination is used as an average phase determination and the corresponding gated clock count is divided, for example, by a factor of 128 in a dividing network 122 to obtain the average expected clock count. The division operation is performed by a well known shift register scaling operation of the counter 116 and 118 outputs.

The output of divider 122 is an average phase determination of the sinusoidal inputted signal and it is coupled from divider 122 to an adder circuit 124 and to a subtractor circuit 126 where the count is increased by an amount corresponding to the desired number of counts corresponding to the maximum positive error and decreased by number of counts corresponding to the maximum negative error desired. Thus, a window or error range is provided which is coupled via high and low gating (not shown) to preset a high-low preset counter 128 of standard and conventional design. The high low preset counter 128 is synchronized by a high speed clock 114.

Delay lines 130 and 132 delay the reference signal generated by the local oscillator 104 and the input signal coupled to the system via line 102 respectively. The delays are for one message length or for the total number of cycles inputted on which a phase determination must be made. Delays 130 and 132 may effectively comprise magnetostrictive delay lines of well known and conventional design of approximately 500 kilohertz bandwidth. A phase detector circuit similar to that described with reference to phase detector 100 is employed except that the output of phase comparator 134 is utilized only during the time gate triggered by the reference signal which is established by the preset counter 128, the time gate being the window established by adder 124 and subtractor 126. The output of phase comparator 134 is coupled to an AND gate 136 along with the high-low preset counter 128 output and is then coupled to the pulse count storage 150 which receives a binary number indicative of the phase determination made by phase detector 100 and outputted by the dividing network 122. This binary number is stored in the error smoothing logic and inputted to an AND gate 138 which is coupled in exclusive OR fashion to AND gate 140 driven by high speed clock 142 to provide the previous accurate phase computation to counter 144 when the delayed signal lies outside the window or error gate set by adder 124 and subtractor 126. Thus, a phase indication which is erroneous and outside the error gate is discarded and a mean average value is substituted therefor, the mean average value being the previous determination made, and inputted to counter 144 in accordance with the cycle count provided by counter 152.

If during the time gate no zero crossing occurs, the pulse count storage 150 generates a pulse count equal to the previously determined average count and inserts this to the missing zero crossing; hence, the worst case performance of this circuit can be no worse than the previous phase calculation performed by the phase detector circuit 100. It has been found that if five gross frequency disturbances are encountered on the average, then the time gate width should be about $-5°$ to $+1°$. An additional counter (not shown) could record the number of zero crossings missed as an indication of the quality of the range determination. Thus a phase determining circuit has been provided which is superior to a gross frequency disturbance detection erasure type circuit and is realized with inexpensive digital integrated circuitry with an iterative technique which may be extended for even better accuracy.

Figure 4:
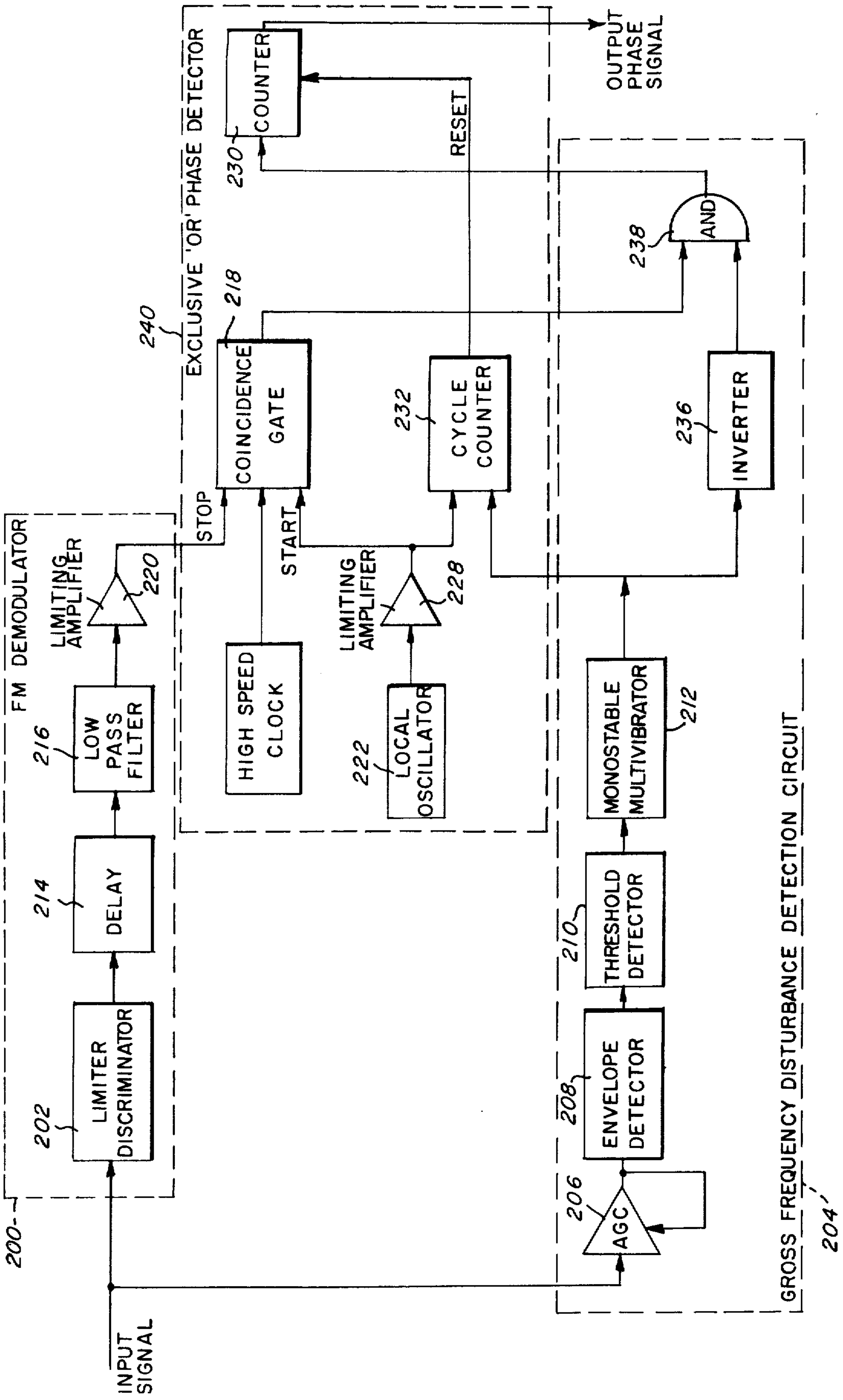
FIG. 4 is an alternative embodiment of the phase determining system of the present invention.

Referring now to FIG. 4 another embodiment of the phase determining system of the present invention is described. As previously mentioned, the correlation existing between the envelope of the received signal at the output of a conventional IF filter and the occurrence of gross frequency disturbances may be used to recognize the occurrence of such disturbances and to gate out any contribution to the phase determination for the expected duration of such disturbance to perform the phase determination on a sample of the incoming signal which is free of such disturbances. The resultant phase determination can then be performed by one of three possible techniques.

The first method of taking the resultant phase determination is to use only those cycles of the modulation tone free of gross frequency disturbances for phase determination and for a preset side tone ranging signal duration.

The second method is to transmit an excess number of cycles of modulation for a preset side tone ranging signal duration whereby the extra cycles are used to replace those corrupted by gross frequency disturbances.

The third method of extracting a phase determination is to proceed with the phase determination until the preset number of modulaton cycles not corrupted by gross frequency disturbances have been processed for a predetermined side tone ranging signal duration, then a reset command is generated for the overall system.

In any of the above schemes, the number of gross frequency disturbances encountered over a given number of modulation cycles can be counted as an indication of expected phase determination accuracy or reliability.

An implementation of the method of transmitting an excess number of cycles of modulation where the extra cycles are used to replace those corrupted by gross frequency disturbances is illustrated by FIG. 4. An input signal which may be the output of a conventional intermediate frequency filter is coupled to both the limiter-discriminator 202 of a conventional FM demodulator 200 and also to a click recognization circuit or gross frequency disturbance detection circuit 204. The gross frequency disturbance recognization circuit comprises an automatic gain control amplifier 206 whose time constant is fast compared to the maximum fading rate anticipated but slow compared to the modulation or side tone frequency the output of which is coupled to an envelope detector 208 and a threshold detector 210 set at a predetermined level the output of which is coupled to a pulse forming monostable multivibrator 212.

When a sudden drop in the noise corrupted signal envelope occurs below the predetermined level, it is detected by the preset threshold detector 210. A sudden drop in the noise corrupted signal envelope is considered to be a faster drop in amplitude than that which might be caused by normal signal fading. The monostable circuit 212 then generates a pulse which is used to suitably gate out the phase determining circuitry.

The FM demodulator 200 comprises a limiter and discriminator 202 to which the input signal is coupled, the output of which is delayed a predetermined amount by delay 214 low pass filtered by low pass filter 216 and coupled as a baseband signal to coincidence gate 218 via limiting amplifier 220. Coincidence gate 218 is turned on by the zero crossing of a reference signal provided by local oscillator 222 and turned off by the zero crossing of the received demodulated baseband signal coupled to the coincidence gate from limiting amplifier 220. Gate 218 in turn turns on a high speed clock for the duration of this coincidence, which high speed clock is counted and the counts are accumulated over the desired number of modulation cycles with the final phase determination being the reading on this counter, counter 230, divided by the number of cycles for zero crossings determined by cycle counter 232 to which the reference signal is coupled via limiting amplifier 228 and which also serves as a reset to counter 230.

A gross frequency disturbance detection circuit 204 eliminates zero crossings of the baseband signal which are corrupted by noise or click and the phase detector 240 is normalized by the number of zero crossings eliminated. Cycle counter 232 is actuated by the output of the gross frequency detection circuit which output is also inverted by inverter 236 and ANDed with the output of coincidence gate 218 in AND circuit 238 to supply the counter 230 with the digital signal to be counted only when the gross frequency disturbance detection output and the output of coincidence gate 218 occurs simultaneously.

Thus, the input to the counter 230 is gated out when a click or gross frequency disturbance has been recognized and the width of the monostable pulse developed by monostable circuit 212 is adjusted to remove the entire corrupted cycle of the modulation while the fixed delay is provided at the FM demodulator output to assure alignment between the click recognition and the actual click occurrence. Alternatively, the monostable circuit can be easily synchronized to the reference tone provided by local osciallator 222 to remove a complete cycle of modulation for a gross frequency disturbance which occurs anywhere in the cycle.

The number of cycles then eliminated can be subtracted from the cycle counter 232 which determines the period within fixed limits. A register can also be employed to accumulate the number of cycles eliminated during each period to indicate when a preset number of cycles has been eliminated which would also serve as an indication of the determination quality.

While particular embodiments of the invention have been shown and described, various modifications thereof will be apparent to those skilled in the art and therefore it is not intended that the invention be limited to the disclosed embodiments or details thereof and departures may be made therefrom within the spirit and scope of the invention as defined in the appended claims.

What is claimed is:

1. A phase determining system comprising in combination:

means for producing a reference signal;

a plurality of serially coupled phase determining stages, each of said stages comprising in combination:

means for receiving a frequency modulated signal;

means for detecting phase variations in a modulation component of said frequency modulated signal;

means for removing disturbance portions in said modulation component when said phase variations exceed a predetermined value; and means for comparing the phase of the unremoved modulation component of said frequency modulated signal with the reference signal, whereby an accurate phase comparison is made after the said phase disturbance portions have been removed.

2. The combination in accordance with claim 1 further comprising means for removing said phase variations for a time approximately equal to the duration of said variations.

3. A phase determining system comprising in combination:

means for producing a reference signal;

a plurality of serially coupled phase determining stages, each of said stages comprising in combination:

means for receiving a frequency modulated signal;

phase detecting means for detecting the phase variations of said frequency modulated signal said reference signal being coupled to the phase detecting means;

means within said phase detecting means for determining when said phase variations fall within said predetermined range;

means for delaying said frequency modulated signal, said delaying means being coupled to the input of said receiving means; and means for coupling of said reference frequency, frequency modulated signal and said delayed signal to phase detecting means within a subsequent phase determining means when the rate of said phase variations falls within said predetermined range.

4. The combination in accordance with claim 3 further comprising means or removing the signal produced by said subsequent phase determining means when said signal produced by said second phase determining means falls outside of said predetermined range; means for inserting the detection signal generated by said phase detection means to said subsequent phase determining means simultaneous with said delayed signal when said signal produced by said subsequent phase determining means is removed.

5. A phase determining system comprising in combination:

means for producing a reference signal;

a plurality of serially coupled phase determining stages, each of said stages comprising in combination;

means for receiving a frequency modulated signal;

means for detecting phase signal disturbance variations;

means for comparing the reference signal with said phase disturbance signal variations;

means for removing at least portions of said phase disturbance signal variations; and means for detecting the phase of a component of the unremoved portion of said frequency modulated signal.

6. The combination in accordance with claim 5 wherein said means for detecting signal variations includes a threshold detector for removing signals above a predetermined threshold.

7. The combination in accordance with claim 6 wherein said means for detecting the phase of the unremoved portion of said FM signal comprises a digital phase detector.

8. The combination in accordance with claim 7 wherein said signal variations are phase disturbance variations.

9. A phase determining system comprising in combination:

means for producing a reference signal;

a plurality of serially coupled phase determining stages, each of said stages comprising in combination:

means for receiving an incoming intermediate frequency modulated signal;

means for demodulating said intermediate frequency modulated signal;

means for detecting phase variations in at least a component of said incoming signal;

means for detecting the coincidence of phase variations with said demodulated signal said coincidence detecting means removing portions of said variations in response to the lack of coincidence;

means for comparing the phase of a component of the unremoved portions of said demodulated signal with the reference signal; and means for dividing said output count by a predetermined number to obtain an average phase determination more acurate than a single phase determination.

means for producing a binary count in response to an output from said comparing means.

10. The combination in accordance with claim 9 wherein said comparing means comprises a digital phase detector which detects zero phase crossings.

11. The combination in accordance with claim 10 wherein said means for detecting phase variations includes an envelope detector coupled to a threshold detector; and monostable means for receiving the output of said threshold detector or developing a pulse for inhibiting said binary count producing means.

12. A phase determining system comprising in combination:

means for producing a reference signal;

a plurality of serially coupled phase determining stages, each of said stages comprising in combination:

means for receiving a frequency modulated signal;

means for comparing the received signal with the reference signal;

means for producing a binary count in response to the comparison between said received signal and said reference signal;

means for detecting the amplitude of said received FM signal;

and means for inhibiting said binary count producing means when the detected amplitude of said received signals is below a predetermined level.

* * * * *